United States Patent [19]

Pearson et al.

[11] Patent Number: 5,534,351

[45] Date of Patent: Jul. 9, 1996

[54] LAMINAR ARTICLES MADE FROM BLENDS OF ETHYLENE-VINYL ALCOHOL COPOLYMERS AND OLEFIN POLYMERS

[75] Inventors: Scott D. Pearson, Woodbury; Diane North, Inver Grove Heights, both of Minn.

[73] Assignee: Minnesota Mining and Manufacturing Company, St. Paul, Minn.

[21] Appl. No.: 313,429

[22] Filed: Sep. 27, 1994

[51] Int. Cl.$^6$ .................................................... B32B 27/08
[52] U.S. Cl. ........................ 428/516; 428/515; 428/36.7
[58] Field of Search ..................................... 428/516, 515, 428/36.7; 264/176 R

[56] References Cited

U.S. PATENT DOCUMENTS

| | | | |
|---|---|---|---|
| 3,487,059 | 12/1969 | Tyran | 260/85.7 |
| 3,519,701 | 7/1970 | Pilato et al. | 260/874 |
| 4,026,967 | 5/1977 | Flexman, Jr. et al. | 260/878 R |
| 4,612,155 | 9/1986 | Wong et al. | 264/176 R |
| 4,971,864 | 11/1990 | McCord | 428/516 |
| 5,133,999 | 7/1992 | Löfrgen | 428/34.2 |
| 5,356,990 | 10/1994 | Pucci | 525/57 |
| 5,399,619 | 3/1995 | Torradas et al. | 525/57 |

FOREIGN PATENT DOCUMENTS

| | | | |
|---|---|---|---|
| 0015556 | 9/1980 | European Pat. Off. . | |
| 0041747 | 12/1981 | European Pat. Off. | B29C 17/03 |
| 0483696A2 | 5/1992 | European Pat. Off. | C08L 23/02 |
| 2257148 | 1/1993 | United Kingdom | C08L 23/98 |
| WO90/14227 | 11/1990 | WIPO | B32B 27/08 |

OTHER PUBLICATIONS

"Ethylene–vinyl alcohol copolymers", Ronald H. Foster, *Modern Plastics Mid–October Encyclopedia Issue*, pp. 84–86.

"Standard Test Method for Flow Rates of Thermoplastics by Extrusin Plastometer", *Designation: D 1238—90b*, pp. 272–280.

Primary Examiner—Stevan A. Resan
Attorney, Agent, or Firm—Gary L. Griswold; Walter N. Kirn; Daniel C. Schulte

[57] ABSTRACT

A laminar article comprising a blend of at least one olefin polymer and at least one ethylene-vinyl alcohol copolymer. If desired, a compatibilizer may also be included in the blend. The melting point of the ethylene-vinyl alcohol copolymer having the highest melting point in the blend is at least 5° C. below the melting point of the olefin polymer having the lowest melting point in the blend. The melt index of the olefin polymer can be higher than, lower than, or equal to the melt index of the ethylene-vinyl alcohol copolymer.

15 Claims, 1 Drawing Sheet

LAMINAR ARTICLES MADE FROM BLENDS OF ETHYLENE-VINYL ALCOHOL COPOLYMERS AND OLEFIN POLYMERS

BACKGROUND OF THE INVENTION

1. Field of the Invention

This invention relates to blends of olefin polymers and ethylene vinyl-alcohol copolymers, and, more particularly, to films and other products that contain these blends.

2. Discussion of the Art

Ethylene-vinyl alcohol copolymers are frequently used in multilayer film constructions with olefin polymers because, together, these polymers provide excellent resistance to permeation by oxygen, water, and hydrocarbons. Blends of ethylene-vinyl alcohol copolymers and olefin polymers provide excellent barrier properties when the ethylene-vinyl alcohol copolymer is distributed in thin, ribbon-like overlapping layers that may or may not be the continuous phase. See, for example, U.S. Pat. No. 4,971,864.

Several investigators have studied blends containing ethylene-vinyl alcohol copolymers and olefin polymers. Such studies have been limited to the effects of using high modulus resins having ethylene copolymer concentrations below 38%. It has not been possible to make superior barrier films from materials having lower modulus values and higher ethylene copolymer ratios.

Many multilayer products available today contain so-called scrap layers, which consist of blends of ethylene-vinyl alcohol copolymer and olefin polymers. Because of processing conditions conventionally used to treat scrap material, films formed from these blends have not been found to be particularly useful as barrier layers. Scrap material is generally used as a filler in films. It would be desirable to develop a fine laminar structure in a layer of scrap material, thereby improving performance of the material as a barrier layer without significantly increasing cost. Additionally, applications requiring flexibility are often difficult to provide and require excessive barrier material because of the stiffness and attendant cracking of the barrier material. Thus, it would be desirable to provide a blend of low modulus copolymer(s) of ethylene-vinyl alcohol and olefin polymer(s) that could be successfully used in barrier materials.

SUMMARY OF THE INVENTION

This invention provides a laminar article comprising a blend of at least one olefin polymer and at least one ethylene-vinyl alcohol copolymer. If desired, a compatibilizer may also be included in the blend. The melting point of the ethylene-vinyl alcohol copolymer in the blend is at least 5° C. below the melting point of the olefin polymer in the blend. The melt index of the olefin polymer can be higher than, lower than, or equal to the melt index of the ethylenevinyl alcohol copolymer. If more than one species of olefin polymer is used in the blend or if more than one species of ethylene-vinyl alcohol copolymer is used in the blend, the melting point of the ethylene-vinyl alcohol copolymer with the highest melting point should be at least 5° C. lower than the melting point of the olefin polymer with the lowest melting point.

Olefin polymers that are preferred for the blend include homopolymers having olefinic monomeric units having at least two carbon atoms, e.g., ethylene, propylene, butylene, and copolymers containing olefinic monomeric units having at least two carbon atoms, e.g., ethylene or propylene. Ethylene-vinyl alcohol copolymers that are preferred for the blend include those described in U.S. Pat. Nos. 3,487,059 and 3,519,701.

It is preferred that the olefin polymer(s) comprise from about 60 to about 90% by weight of the blend, and it is preferred that the ethylene-vinyl alcohol copolymer(s) comprise from about 10 to 40% by weight of the blend.

The laminar article of this invention has excellent oxygen barrier properties.

The articles can be processed to form films, e.g., barrier films, coated paperboard products, and medical products, e.g., containers.

The blends that are used to prepare the articles of this invention greatly simplify manufacturing operations normally required for stratified barrier products, provide opportunities to recycle scrap materials into useful layers or products, and offer unique physical properties such as flexibility and softness.

DETAILED DESCRIPTION OF THE INVENTION

Figure 1:
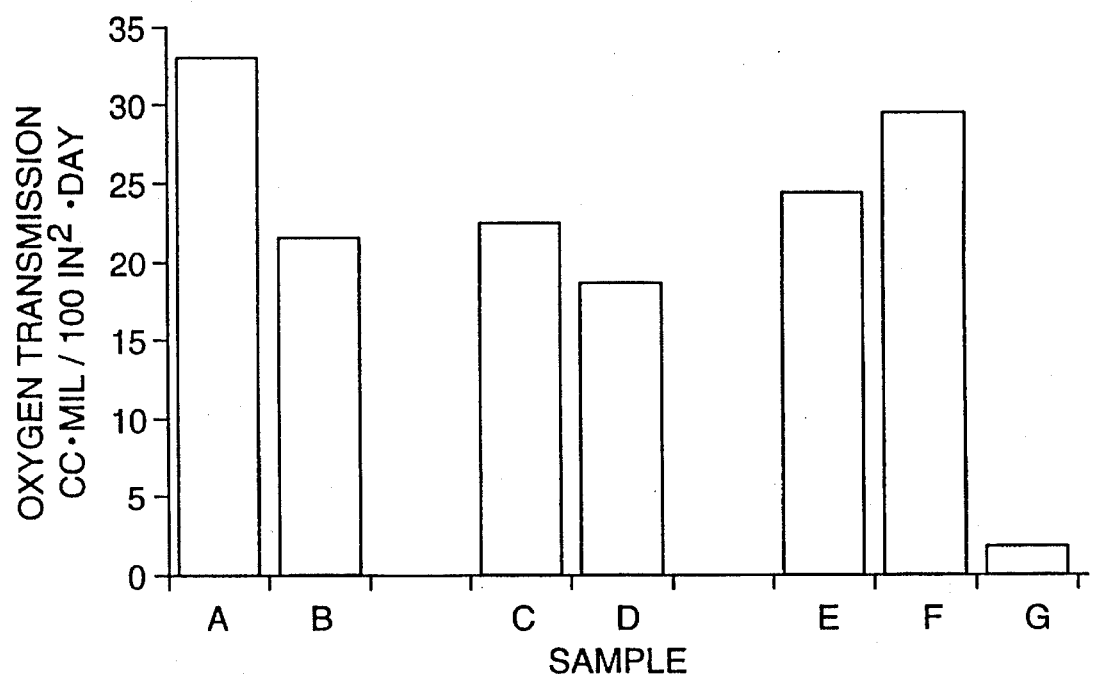
FIG. 1 is a graph that illustrates the effect of various blends of ethylene-vinyl alcohol copolymer and olefin polymer on oxygen transmission.

As used herein, the expression "olefin polymer" means a polymer or a copolymer containing olefinic monomeric units. The expression "olefin polymer" does not include ethylene-vinyl alcohol copolymer. The olefin polymer may contain moieties other than olefinic monomeric units. The expression "ethylene-vinyl alcohol copolymer" means hydrolyzed copolymers of vinyl acetate and ethylene. The term "laminar" means that the dispersed component of the blend (i.e., discontinuous phase) is present within the dispersing component of the blend (i.e., continuous phase) as multiple, thin, substantially parallel, overlapping layers. The term "compatibilizer" means a polymer that serves to adhere adjacent layers of olefin polymer and ethylene-vinyl alcohol copolymer to one another.

Olefin polymers useful for preparing the laminar articles of this invention include homopolymers and copolymers containing units of ethylene, propylene, butylene, and other commercially available olefinic monomers. Homopolymers of ethylene are preferred, and these may be high, medium, or low density ethylene homopolymers.

Ethylene-vinyl alcohol copolymers are highly crystalline in nature and their properties are highly dependent upon the relative concentration of the comonomers. Generally speaking, as the ethylene content increases, the gas-barrier properties decrease, the moisture-barrier properties improve, and the resins process more easily. Ethylene-vinyl alcohol copolymers useful for preparing the laminar article of this invention include commercially available ethylene-vinyl alcohol copolymers. Examples of ethylene-vinyl alcohol copolymers suitable for this invention are described in U.S. Pat. Nos. 3,487,059 and 3,519,701, incorporated herein by reference.

The melting point of ethylene-vinyl alcohol copolymer should be at least 5° C. below the melting point of the olefin polymer. If more than one species of olefin polymer is used in the blend or if more than one species of ethylene-vinyl alcohol copolymer is used in the blend, the melting point of the ethylene-vinyl alcohol copolymer with the highest melting point should be at least 5° C. lower than the melting point of the olefin polymer with the lowest melting point. It has been found that this melting point relationship allows formation of a melted heterogeneous blend. It has further been found that the ratio of the melt index of the olefin polymer to the melt index of ethylene-vinyl alcohol copolymer can be equal to or greater than 1 or less than 1. For a gas barrier film, it is preferred that the ratio of the melt index of olefin polymer to the melt index of ethylene-vinyl alcohol copolymer be less than 1. As used herein, melt index is measured in accordance with ASTM D 1238-90b.

In the laminar articles of this invention, the ethylene-vinyl alcohol copolymer, which provides the discontinuous phase, is typically present in amounts of from about 10% to about 40% by weight, preferably from about 15% to about 20% by weight, based on the total weight of olefin polymers and ethylene-vinyl alcohol copolymer. Laminar articles containing less than about 10% by weight of ethylene-vinyl alcohol copolymer generally do not exhibit a sufficient level of barrier properties toward oxygen or hydrocarbons to be useful commercially. Laminar articles containing greater than about 40% by weight of ethylene-vinyl alcohol copolymer are useful, but tend to be too costly for commercial purposes.

The amount of olefin polymer useful in the laminar articles of this invention is clearly 100% by weight less the sum of the percentage of ethylene-vinyl alcohol copolymer (not counting any additional minor amounts of conventional additives, fillers, etc., or compatibilizer, all of which may be used). It is preferable that the concentration of olefin polymer not be less than 60% by weight and more preferable that the concentration not be less than 90% by weight, based on the total weight of olefin polymer and ethylene-vinyl alcohol copolymer in the laminar article. In general, it is preferred that the olefin polymer(s) and ethylene-vinyl alcohol copolymer(s) constitute at least about 85% by weight of the laminar article, more preferably at least about 90% by weight of the laminar article, and most preferably at least about 95% of the laminar article.

The articles of the present invention can be prepared substantially by the process described in U.S. Pat. No. 4,971,864, which is incorporated herein by reference. The laminated articles are preferably made by combining particles of the olefin polymer, particles of the ethylene-vinyl alcohol copolymer, and particles of the compatibilizer, if used, to form a mixture, heating the mixture to form a heterogeneous melt, and forming the melt in a way that results in extending the melt to yield multiple elongated discontinuous polymer domains consisting of the ethylene-vinyl alcohol copolymer within a continuous domain of polyolefin. As used herein, the expression "extending the melt" means that a given volume of melt is shaped by means which significantly increase its surface area, such as the extension which would occur when the melt is squeezed by rollers, pressed between platens, extended between die lips, or inflated during blow molding.

In one embodiment, the particles of olefin copolymer and ethylene-vinyl alcohol copolymer, in solid form, are mixed thoroughly so as to provide a statistically homogeneous distribution. The dry mix is then fed to a single-screw extruder, for example, where upon heating, the lower melting ethylene vinyl alcohol copolymer melts first. After the higher melting olefin polymer subsequently melts, care must be exercised to avoid substantial additional mixing. The blend can also be established by combining molten ethylene-vinyl alcohol copolymer with solid particles of olefin polymer and then heating the combination. When extended, e.g., by extrusion, the melted heterogeneous blend of polymers yields an article in which the olefin polymer is in the form of a continuous (i.e., matrix) phase and the ethylene-vinyl alcohol polymer is in the form of a discontinuous (i.e., distributed) phase. The ethylene-vinyl alcohol copolymer of the discontinuous phase is present as a multitude of thin, parallel, and overlapping layers embedded in the olefin polymer of the continuous phase.

Although it is not required, it is preferred that both the olefin polymer and the ethylene-vinyl alcohol copolymer should be mixed as particles. The particles should, as a general rule, be of a size such that the molten blend of incompatible polymers, when introduced to some means for melt extension, such as extrusion die lips, exhibits the heterogeneity necessary for practice of the invention. When the particles of the mixture, especially particles of the ethylene-vinyl alcohol copolymer, are of too small a size, the melted blend, even though not excessively mixed, tends to function as a homogeneous composition because the domains of material making up the discontinuous polymer phase are so small. When the particles of the blend, especially particles of the ethylene-vinyl alcohol copolymer are of too large a size, the melt blend tends to form into shaped articles having a marbleized structure rather than a laminar structure, because the large domains of the materials that would make up the discontinuous phase extend to opposite boundaries of the shaped articles, thereby causing disruption of the olefin polymer which would make up the continuous phase. Particles having a size of from about 1 to about 7 mm, preferably from about 2 to about 4 mm, on a side have been found to be particularly well suited for the blend. The particles are preferably generally regular in shape, such as spherical, cubical, or cylindrical, or the like. The particles may, however, be irregular; and they may have one or two dimensions substantially greater than other dimensions. Such would be the case, for example, when flakes of material are used.

When each of the incompatible polymers is present as individual particles, the particles are preferably of approximately the same size, although this preference is not required.

The thickness of the layers of material in the discontinuous phase is a function of the particle size combined with the degree of extension in the forming step. The particle size of the ethylene-vinyl alcohol copolymer is generally selected with a view toward obtaining, after extension, overlapping layers which can be from about 1 to about 60 micrometers thick or perhaps slightly thicker.

A compatibilizer can be provided as distinct individual particles, or it can be mixed into, coated onto, or otherwise combined with the olefin polymer. It is preferred not to melt blend the compatibilizer directly with the ethylene-vinyl alcohol copolymer prior to making the laminar articles, because some compatibilizers appear to cause gelation or crosslinking of the ethylene-vinyl alcohol copolymer when so blended. In order to insure that the compatibilizer is well distributed in the final blend, it is sometimes desirable to supply the compatibilizer in a powdered, rather than a pelletized form.

The compatibilizer can be a graft polymer with a polyolefin backbone onto which cyclic anhydride moieties, derived from maleic anhydride, for example, have been grafted. The compatibilizer serves to adhere adjacent layers of polyolefin and ethylene-vinyl alcohol copolymer to one another. It is important in preparing the laminar articles of this invention that the olefin polymer serving as the backbone of the graft polymer be miscible, prior to grafting, with the olefin polymer. In effect, this restriction essentially requires that the compatibilizer be prepared from a polymeric backbone that contains at least some polyethylene segments when the olefin polymer is polyethylene or from a polymeric backbone that contains at least some polypropylene segments when the olefin polymer is polypropylene. However, it is recognized that random copolymers containing only very small amounts of olefin comonomer are probably miscible with homopolymers based on the major component of such random copolymers. For instance, it is believed that random ethylene-propylene copolymers containing up to about 8 mole per cent ethylene are miscible with polypropylene homopolymer. Even such closely related polymer backbones as ethylene-propylene-hexadiene terpolymers having maleic anhydride moieties grafted thereon are less effective when the olefin polymer is polyethylene or polypropylene than are compatibilizers based on polymer backbones which correspond more uniformly to the olefin polymer. The compatibilizer is further characterized in that it contains grafted cyclic anhydride moieties in an amount such that carbonyl content of the compatibilizer is about 0.3–0.4% by weight. Such grafts can be prepared with anhydride contents ranging from essentially 0 to about 8% anhydride, expressed as weight percent maleic anhydride. A useful range of anhydride content is about 0.5 to about 5.5% anhydride, expressed as weight percent maleic anhydride, or a carbonyl content of about 0.3 to about 4%.

Compatibilizers can be prepared by procedures such as those described in U.S. Pat. Nos. 4,026,967 and 4,612,155, the disclosures of which are incorporated herein by reference. While numerous compounds can be used as graft monomers, maleic anhydride is preferred. Less preferred graft monomers include mono-esters of maleic acid, maleic acid, and fumaric acid, which monomers are believed to be largely converted to cyclic anhydride moieties at the high temperatures encountered during the grafting reaction. Also suitable are other cyclic anhydrides containing carbon-carbon unsaturation such as dodecenyl succinic anhydride, 5-norbornene-2,3-anhydride, and 3,6-endomethylene-1,2,3,6-tetrahydrophthalic anhydride.

Dry mixing particles of the polymers can be accomplished by any well-known means such as by means of a V-blender or a tumble mixer or, on a larger scale, by means of a double-cone blender. Continuous mixing of the particles can be accomplished by any of several well-known methods. Of course, the particles can also be mixed by hand. The only requirement of the mixing is that any two statistical samplings of the mixture in a given mass of material should yield approximately or substantially the same composition. The mixing of the incompatible polymers can also be accomplished by adding particles of the higher melting polymer to a melt containing the lower melting polymer, wherein the melt is maintained at a temperature below the melting point of the higher melting polymer. In that case, the melt can be agitated to obtain an adequate mixture; and the mixture is, thus, ready for the final heating step.

Once mixed, the incompatible polymers are ultimately heated to a temperature greater than the melting point of the higher melting polymer. The heating yields a molten heterogeneous blend of materials which is ready for the stretching step of the process. The heating must be conducted in a manner that avoids substantial additional mixing of the incompatible polymers, because such mixing could cause homogenization and could result in a melt and a shaped article of substantially uniform, nonlaminar structure. The heating can be conducted by any of several well-known means and is usually conducted in an extruder. It has been found that a single-screw extruder of the type that is designed for material transport rather than material mixing can be used for the heating step and for transporting material to the forming steps of this process without causing homogenization of the molten two-phase polymer composition. Both low shear and low mixing extruders of the kind normally used for polyvinyl chloride, acrylonitrile, or polyvinylidene chloride and high shear and high mixing extruders of the kind normally used for nylon and polyethylene can be used to prepare the articles of this invention if they are used in a way to melt and transport the materials while minimizing mixing of the components.

The forming step requires extension of the molten blend followed by cooling. Melt extension can be accomplished by any of several means. For example, the melt can be extended by being squeezed between rollers, pressed between platens, or extruded between die lips. Molding processes such as blow molding can also bring about extension in accordance with this process. In the manufacture of shaped articles such as containers, the extension can be accomplished by a combination of extruding a blend of the heterogeneous melt to yield a container preform or parison followed by blow molding the parison into a finished container.

The extension or melt forming can be in a single direction or in perpendicular directions. Whether the forming is conducted in one direction or two, there should be an elongation of from about 10 to 500 or even 1000 percent or more in at least one direction; an elongation of about 100 to about 300 percent is preferred. Avoidance of excessive extension is important only insofar as excessive elongation of the melt may lead to weakening or rupture of the article.

Melt extension or forming is followed by cooling to below the temperature of the melting point of the ethylene-vinyl alcohol copolymer to solidify the shaped article. The cooling can be conducted by any desired means and at any convenient rate.

The articles of this invention are particularly useful when they are processed into films. The thickness of such films preferably ranges from about 1 to about 10 mils. Such films provide excellent barrier properties, particularly with respect to oxygen, carbon dioxide, water vapor, and other gases.

The films can be used in such areas as wrapping material, coated paperboard, laminated structures, containers, including rigid packaging material and flexible packaging material.

In the following examples, all parts and percentages are based on weight unless indicated otherwise.

EXAMPLES

Film samples were extruded and cast from dry blends listed in Table 1. In the table, "PP" represents a polypropylene, "EVOH" represents an ethylene-vinyl alcohol copolymer, and "EVA" represents an ethylene-vinyl acetate copolymer. Extrusion temperature was 430° F. The screw was a standard olefin type at 24 L/D and 2.5:1 compression. The die was a single manifold coathanger film die with a 10 mil land gap. The speed of the extruder was varied between 15 and 70 rpm as shown. Chill roll temperature was set at 95° F.

TABLE 1

| Sample | Amount of ingredient (%) | | | | Ratio of melt index of PP/ EVOH | Extruder (rpm) |
|---|---|---|---|---|---|---|
|  | PP3576 | PP3868 | EVOH | EVA |  |  |
| A | 13.0 | 75.0 | 12.0 | — | 2.1 | 15 |
| B | 13.0 | 75.0 | 12.0 | — | 2.1 | 70 |
| C | 87.5 | — | 12.5 | — | 0.6 | 15 |
| D | 87.5 | — | 12.5 | — | 0.6 | 70 |
| E | 87.5 | — | 12.5 | — | 0.6 | 44 |
| F | 82.3 | — | 11.8 | 5.9 | 0.6 | 44 |
| G | 70.0 | — | 10.0 | 10.0 | 0.6 | 44 |

The polypropylene PP3868 has a melting point of 165° C. and a melt index of 37.0 and the polypropylene PP3576 has a melting point of 165° C. and a melt index of 9.0. Ethylene-vinyl acetate (UE656003) has a Vicat softening point of 77° C. and a melt index of 5.4 (Quantum, 12% vinyl acetate incorporated), and ethylene-vinyl alcohol has a melting point of 158° C. and a melt index of 14.0 ("EVAL G110", 48% ethylene in the copolymer)

Oxygen permeability tests were performed on the samples by means of a "MOCON OX-TRAN 1000" oxygen transmission analyzer at 0% relative humidity and a temperature of 25.6° F. FIG. 1 illustrates the oxygen transmission for each sample. The data show that at moderate levels of ethylene-vinyl alcohol (11%–12%), the samples demonstrated good barrier properties ranging from 18 to 33 cc.mil/100 sq. in. day compared to pure polypropylene, which was an order of magnitude higher, e.g., about 430 cc.mil/100 sq. in. day. It was also shown that the barrier resistance to oxygen could be improved by increasing the speed of the extruder. When the melt index ratio of the continuous polypropylene phase to the discontinuous ethylene-vinyl alcohol phase was greater than 1.0, as in Samples A and B, a greater improvement was observed. A smaller improvement was observed when the melt index ratio was less than 1.0, as in Samples C and D. When the melt index ratio was less than 1.0, the ethylene-vinyl alcohol was sufficiently well distributed and overlapping that only modest improvements could be gained through changes in processing. Further increases in ethylene-vinyl alcohol content are probably required to improve the barrier properties.

When a compatibilizer such as ethylene-vinyl acetate (UE656003) was added, as in Sample F, the barrier properties were slightly reduced. However, increasing the ethylene-vinyl alcohol level to 20% produced a dramatic improvement in barrier properties, more than would be expected on a cumulative composition basis. A concentration of ethylene-vinyl alcohol of at least 15% by weight was preferred to ensure sufficient overlap of the stratified layer.

Optical microscopy (transmission polarized light at 630 magnification) of the samples was used to examine the structural changes that accompany differences in composition and processing conditions. The striated structure was readily identifiable. Samples that exhibit higher permeabilities showed relatively poorer stratification of the ethylene vinyl alcohol.

Mechanical testing of the blended films shows roughly a 16% reduction in the tensile modulus compared to that of a standard layered construction.

The combination of melt index ratio, temperature relationship, and processing conditions is important in producing blends that will provide effective barriers. In multilayer applications, a multi-manifolded die would be advantageous for processing the barrier blend layer to ensure that proper shear forces are present to stratify the ethylene-vinyl alcohol.

Various modifications and alterations of this invention will become apparent to those skilled in the art without departing from the scope and spirit of this invention, and it should be understood that this invention is not to be unduly limited to the illustrated embodiments set forth herein.

What is claimed is:

1. A laminar article comprising a
   (a) at least one olefin polymer;
   (b) at least one ethylene-vinyl alcohol copolymer, said at least one ethylene-vinyl alcohol copolymer having a melting point at least about 5° C. lower than that of said at least one olefin polymer, wherein the ethylene vinyl alcohol copolymer is present within the olefin polymer as multiple, thin, substantially parallel, overlapping layers.

2. The article of claim 1, wherein the concentration of said olefin polymer ranges from about 60% to about 90% by weight and the concentration of said ethylene-vinyl alcohol copolymer ranges from about 10% to about 40% by weight, based on the total weight of olefin polymer and ethylene-vinyl alcohol copolymer.

3. The article of claim 1, wherein the concentration of said olefin polymer ranges from about 80% to about 85% by weight and the concentration of said ethylene-vinyl alcohol copolymer ranges from about 15% to about 20% by weight, based on the total weight of olefin polymer and ethylene-vinyl alcohol copolymer.

4. The article of claim 1, wherein the ratio of melt index of the olefin polymer to the melt index of the ethylene-vinyl alcohol copolymer is less than 1.

5. The article of claim 1, wherein the ratio of melt index of the olefin polymer to melt index of the ethylene-vinyl alcohol copolymer is equal to or greater than 1.

6. The article of claim 1, further including a compatibilizer.

7. The article of claim 6, wherein the compatibilizer is ethylene vinyl acetate.

8. The article of claim 1, wherein said at least one olefin polymer is a homopolymer having olefinic monomeric units containing up to four carbon atoms.

9. The article of claim 1, wherein said at least one olefin polymer is a copolymer having olefinic monomeric units containing up to four carbon atoms.

10. The article of claim 1, wherein said article is in the form of a film.

11. A wrapping material comprising the laminar article of claim 1.

12. A coated paperboard comprising the laminar article of claim 1.

13. A container comprising the laminated article of claim 1.

14. A flexible packaging material comprising the laminated article of claim 1.

15. A rigid packaging material comprising the laminated article of claim 1.

* * * * *